(12) United States Patent
    Jaw

(10) Patent No.: US 10,737,374 B2
(45) Date of Patent: Aug. 11, 2020

(54) GRIP STRAP WITH ANTI-SHOCK AND VENTILATION EFFECTS

(71) Applicant: Leo Jaw, Taichung (TW)

(72) Inventor: Leo Jaw, Taichung (TW)

(*) Notice: Subject to any disclaimer, the term of this patent is extended or adjusted under 35 U.S.C. 154(b) by 20 days.

(21) Appl. No.: 16/022,825

(22) Filed: Jun. 29, 2018

(65) Prior Publication Data

US 2018/0304455 A1    Oct. 25, 2018

Related U.S. Application Data

(63) Continuation-in-part of application No. 15/413,471, filed on Jan. 24, 2017, now abandoned, which is a
(Continued)

(51) Int. Cl.
*B25G 1/01*    (2006.01)
*A63B 60/18*   (2015.01)
(Continued)

(52) U.S. Cl.
CPC .............. *B25G 1/01* (2013.01); *A63B 60/08* (2015.10); *A63B 60/14* (2015.10); *A63B 60/18* (2015.10); *A63B 60/54* (2015.10); *A63B 2209/00* (2013.01); *B32B 3/085* (2013.01); *B32B 3/30* (2013.01); *B32B 25/042* (2013.01); *B32B 25/14* (2013.01); *B32B 27/06* (2013.01); *B32B 27/306* (2013.01); *B32B 27/40* (2013.01); *B32B 2250/02* (2013.01); *B32B 2250/04* (2013.01);
(Continued)

(58) Field of Classification Search
CPC .......... B25G 1/01; A63B 60/00; A63B 60/46; A63B 60/54; A63B 60/14; A63B 60/08; A63B 60/18; A63B 2209/00; B32B 3/30; B32B 3/085; B32B 25/042; B32B 25/14; B32B 27/06; B32B 27/306; B32B 27/40; B32B 2250/02; B32B 2250/04; B32B 2307/51; B32B 2307/56; B32B 2307/744; B32B 2405/00

See application file for complete search history.

(56) References Cited

U.S. PATENT DOCUMENTS 5,055,340 A    10/1991  Matsumura et al.
6,073,381 A *  6/2000  Farrar ................ F41C 23/10
                                                     42/71.02
(Continued)

FOREIGN PATENT DOCUMENTS

CN    2201964 Y    6/1995
CN    2460146 Y    11/2001
(Continued)

*Primary Examiner* — Donald J Loney
(74) *Attorney, Agent, or Firm* — Alan D. Kamrath; Karin L. Williams; Mayer & Williams PC

(57) ABSTRACT

An anti-shock and ventilated grip strap includes a strap body including a substrate and a cushion layer overlapping the substrate. Each of the substrate and the cushion layer is in a form of a strap. The strap body has a hardness in the range of 40-70 in ASTM D2240 Type C hardness scale. A plurality of elastic members is disposed on and protruding away from the cushion layer. The plurality of elastic members is arranged separately from one another. Each of plurality of elastic members has a hardness greater than the substrate and greater than the cushion layer of the strap body.

16 Claims, 6 Drawing Sheets

Related U.S. Application Data continuation-in-part of application No. 14/461,461, filed on Aug. 18, 2014, now abandoned.

(51) Int. Cl.

| | |
|---|---|
| A63B 60/54 | (2015.01) |
| B32B 25/04 | (2006.01) |
| B32B 25/14 | (2006.01) |
| B32B 27/06 | (2006.01) |
| B32B 27/30 | (2006.01) |
| B32B 27/40 | (2006.01) |
| B32B 3/08 | (2006.01) |
| B32B 3/30 | (2006.01) |
| A63B 60/14 | (2015.01) |
| A63B 60/08 | (2015.01) |

(52) U.S. Cl.
CPC ....... *B32B 2307/51* (2013.01); *B32B 2307/56* (2013.01); *B32B 2307/744* (2013.01); *B32B 2405/00* (2013.01)

(56) References Cited

U.S. PATENT DOCUMENTS

| | | | |
|---|---|---|---|
| 6,686,026 | B2 | 2/2004 | Spiewak |
| 7,140,973 | B2 | 11/2006 | Rohrer |
| 2003/0207241 | A1* | 11/2003 | Manual ............ A63B 53/14 434/252 |
| 2005/0233114 | A1 | 10/2005 | Chi |
| 2007/0149308 | A1 | 6/2007 | Wang |
| 2012/0283035 | A1 | 11/2012 | Wang |
| 2018/0078836 | A1* | 3/2018 | Davis ............ A63B 60/14 |

FOREIGN PATENT DOCUMENTS

| | | |
|---|---|---|
| CN | 203609827 U | 5/2014 |
| TW | M368467 U1 | 11/2009 |

* cited by examiner

GRIP STRAP WITH ANTI-SHOCK AND VENTILATION EFFECTS

CROSS REFERENCE TO RELATED APPLICATION

The present application is a continuation-in-part application of U.S. patent application Ser. No. 15/413,471, filed on Jan. 24, 2017, which is a continuation-in-part application of U.S. patent application Ser. No. 14/461,461, filed on Aug. 18, 2014, now abandoned.

BACKGROUND OF THE INVENTION

1. Field of the Invention

The present invention relates to a grip strap and, particularly, to an anti-shock and ventilated grip strap.

2. Description of the Related Art

TW Pat. No. M368467 shows a grip strap. The grip strap is elongated. The grip strap includes a fabric layer and an elastic layer. The fabric layer has a plurality of orifices. The elastic layer is made of a form, e.g., LATEX or natural rubber (NR). The elastic layer is adhered to a side of the fabric layer. The side of the fabric layer is in surface contact with a first attach side of the elastic layer. The elastic layer is a sheet and has a plurality of permeable sections. When the grip strap is wrapped around a handle, a second attach side of the elastic layer opposite to the first attach side faces and abuts against the outer periphery of the handle, the second attach side of the elastic layer is in frictional contact with and contacts with the outer periphery of the handle without any gaps. Though the grip strap is soft and has permeable sections, it does not absorb shocks and allows air ventilation effectively.

The present invention is, therefore, intended to obviate or at least alleviate the problems encountered in the prior art.

SUMMARY OF THE INVENTION

According to the present invention, an anti-shock and ventilated grip strap includes a strap body including a substrate and a cushion layer overlapping the substrate. Each of the substrate and the cushion layer is in a form of a strap. The strap body has a hardness in the range of 40-70 in ASTM D2240 Type C hardness scale. A plurality of elastic members is disposed on and protruding away from the cushion layer. The plurality of elastic members is arranged separately from one another. Each of the plurality of elastic members has a hardness greater than that of the strap body.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure. The abstract is neither intended to define the invention, which is measured by the claims, nor is it intended to be limiting as to the scope of the invention in any way.

Other objectives, advantages, and new features of the present invention will become apparent from the following detailed description of the invention when considered in conjunction with the accompanied drawings.

DETAILED DESCRIPTION OF THE INVENTION

Figure 1:
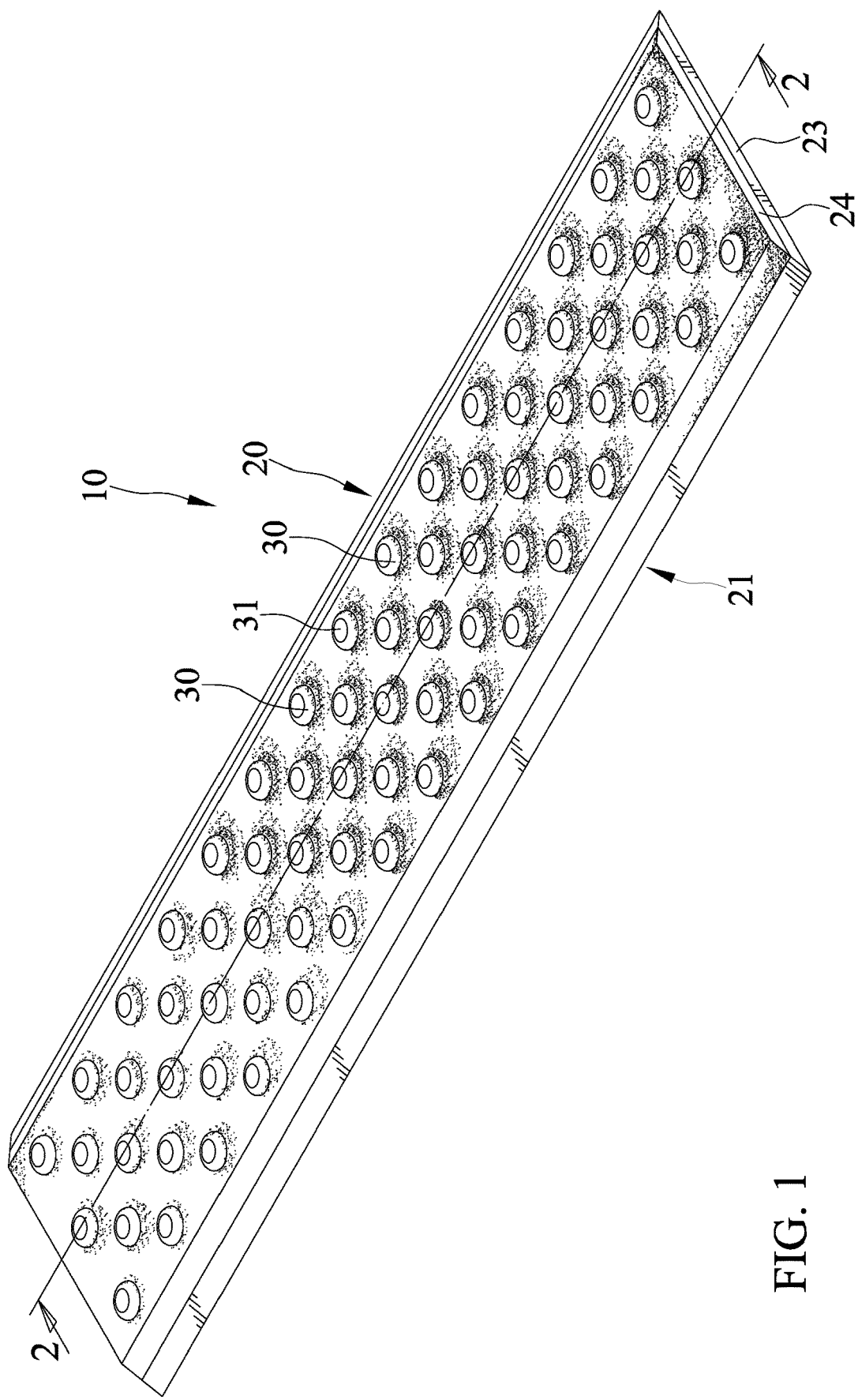
FIG. 1 is a perspective view of a grip strap in accordance with the present invention.
Figure 2:
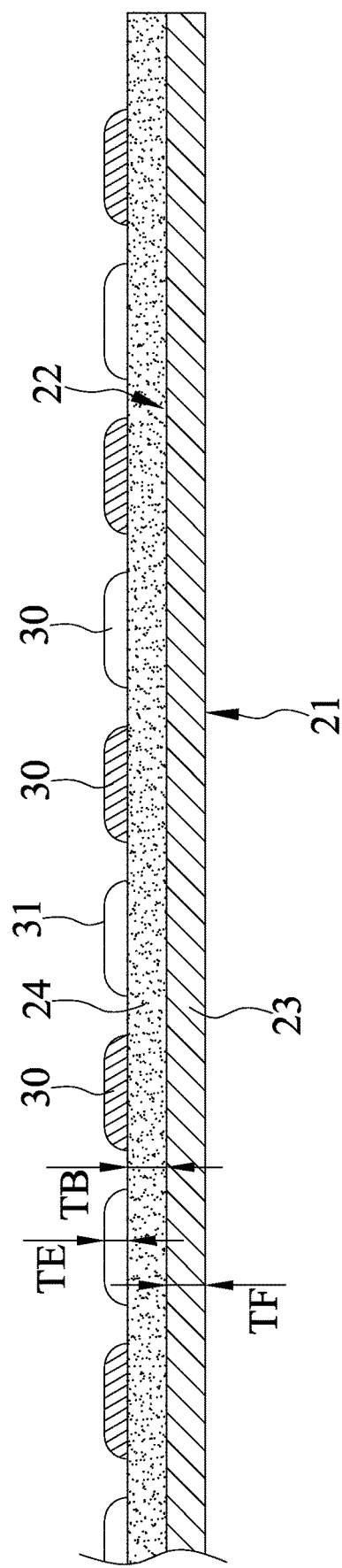
FIG. 2 is a cross-sectional view taken along line 2-2 of FIG. 1.

FIGS. 1 through 6 show a grip strap 10 with anti-shock and ventilation effects in accordance with the present invention. The grip strap 10 includes a strap body 20 and a plurality of elastic members 30 protruding from the strap body 20. The strap body 20 is elongated. The strap body 20 includes a substrate 23 and a cushion layer 24 each in a form of a strap. The substrate 23 has a front side 21 and a back side 22 opposite to the front side 21. The cushion layer 24 is disposed on and overlaps the back side 22 of the substrate 23. The substrate 23 and the cushion layer 24 are arranged in a thickness direction of the strap body 20. The strap body 20, which includes the substrate 23 and the cushion layer 24, has a hardness in the range of 40-70 in ASTM D2240 Type C hardness scale. The substrate 23 has an original thickness TF in the thickness direction of the strap body 20. The cushion layer 24 has an original thickness TB in the thickness direction of the strap body 20. The thickness TB is between 0.8 and 1.2 times of the thickness TF. In the embodiment, the thickness TB equals to the thickness TF. The substrate 23 is made of polyurethane (PU). The cushion layer 24 is made of an elastomer material. Preferably, the cushion layer 24 is made of Ethylene Vinyl Acetate (EVA) or Thermoplastic Polyurethane (TPU), or cloth.

The plurality of elastic members 30 is disposed on and protrudes away from the cushion layer 24. Each of the plurality of elastic members 30 has a bottom edge in contact with the back side of the strap body 20 and a top edge opposite to the bottom edge. The top edges of the plurality of elastic member 30 include adhesive material 31 disposed thereon. The top edges of the plurality of elastic members 30 are at the same height. The plurality of elastic members 30 is disposed along a longitudinal length direction of strap body 20, which is perpendicular to the thickness direction of the strap body 20. The plurality of elastic members 30 is arranged separately and does not contact with one another. Each of the plurality of elastic member 30 has a hardness greater than that of the substrate 23 and that of the cushion layer 24. Each of the plurality of elastic member 30 has an original thickness TE in the thickness direction of the strap body 20. The thickness TE is not less than half of the thickness TB. The thickness TE is not greater than the thickness TB. Each of the plurality of the elastic members 30 has a circular circumferential shape, but not limited thereto. The plurality of elastic members 30 and the cushion layer 24 are connected together by an integral forming method.

Figure 3:
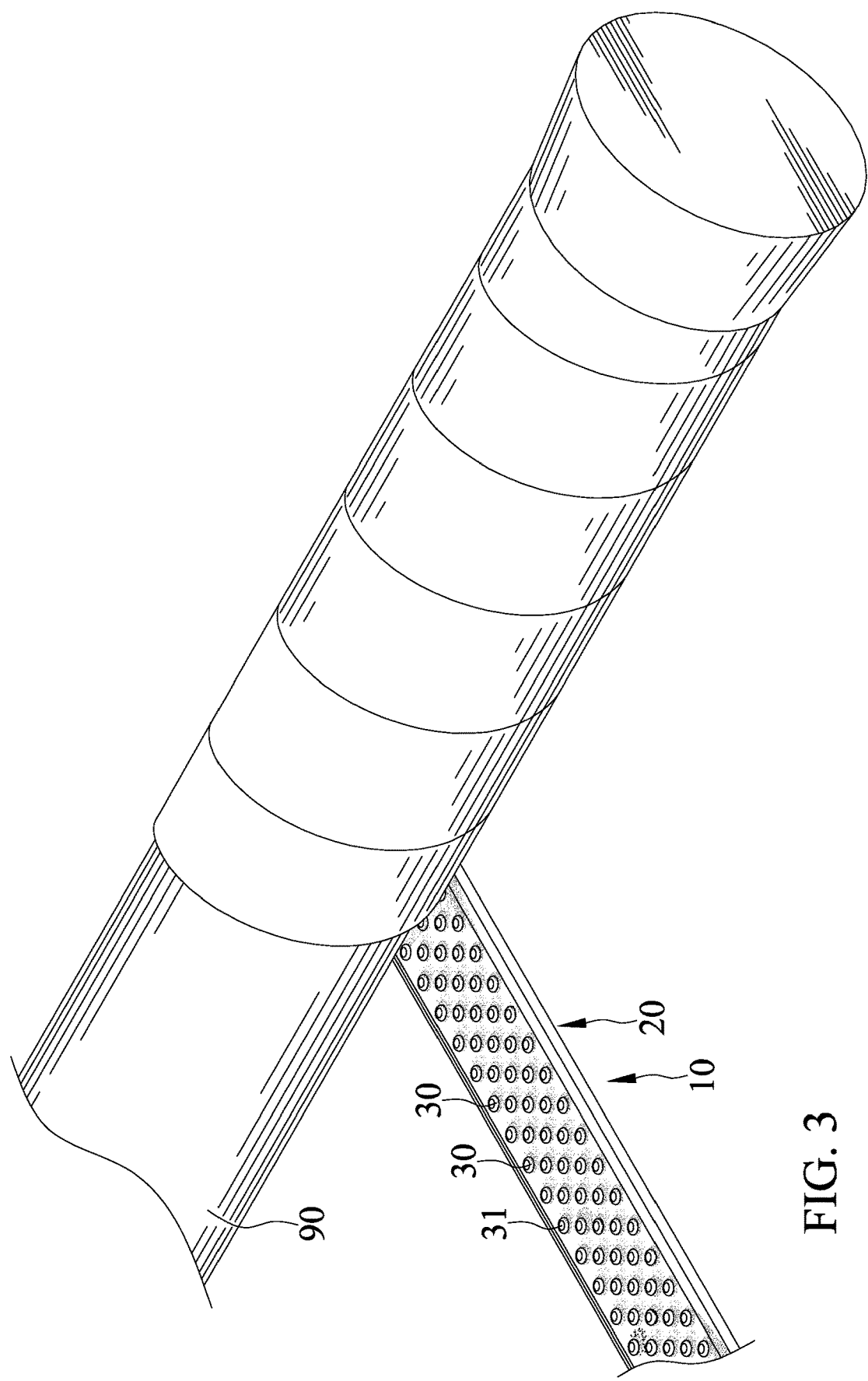
FIG. 3 shows the grip strap of the present invention in use with a handle, with the grip strap wrapping around a handle.
Figure 4:
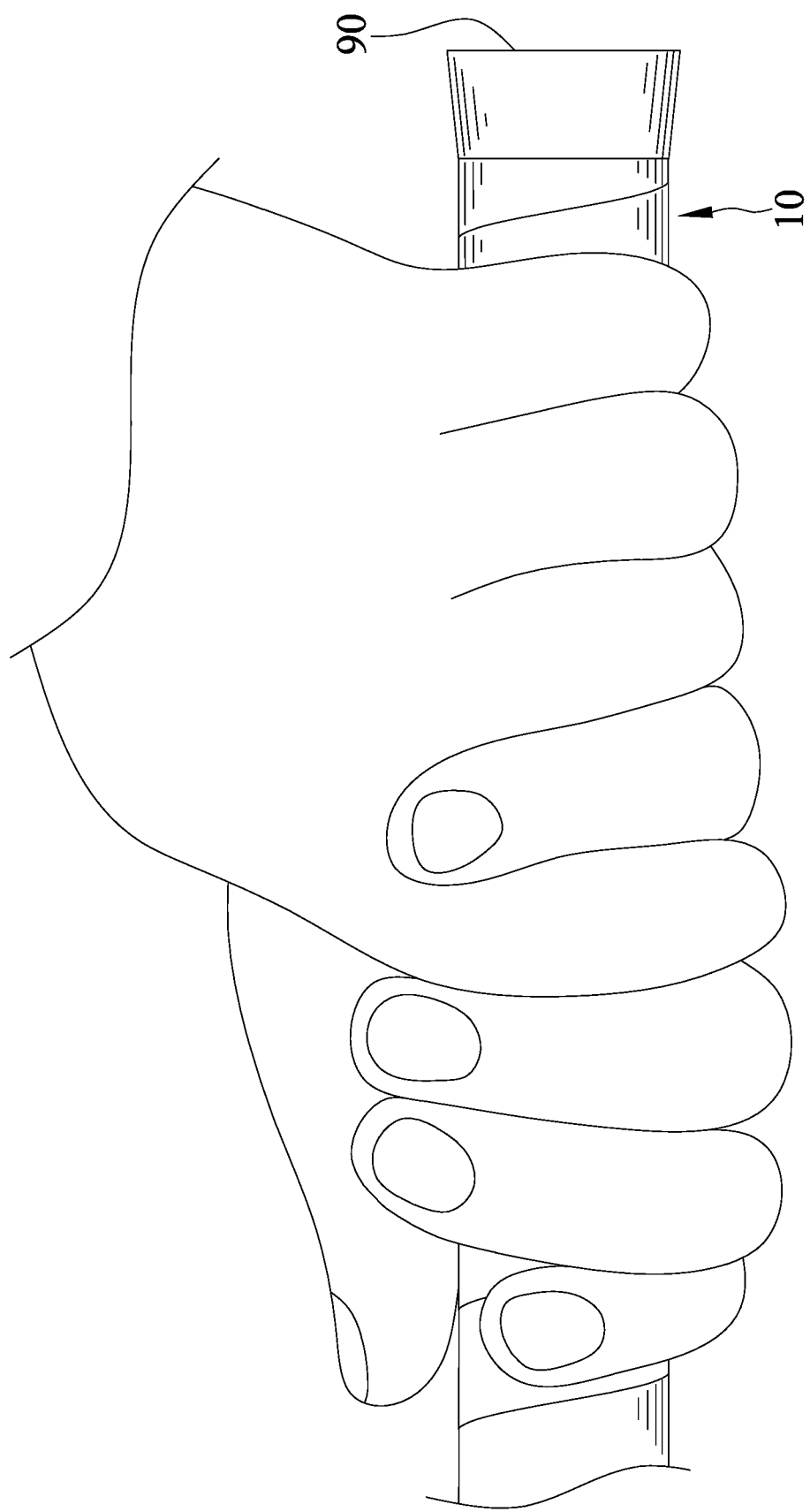
FIG. 4 shows a user gripping the grip strap and the handle shown in FIG. 3.

As shown in FIG. 3, the grip strap 10 is wrapped spirally around a handle 90. The plurality of elastic members 30 adheres to and abuts against the handle 90. The front side 21 of the substrate 23 is exposed and defines a receiving area for a user's hand. Each of the plurality of elastic members 30 has the top edge thereof in frictional contact with the outer periphery of the handle 90 and prevents the grip strap 10 slip relative to the handle 90 inadvertently. Additionally, since the front side 21 of the substrate 23 is smooth and flat, the user can comfortably grasp the grip strap 10 and the handle 90.

Figure 5:
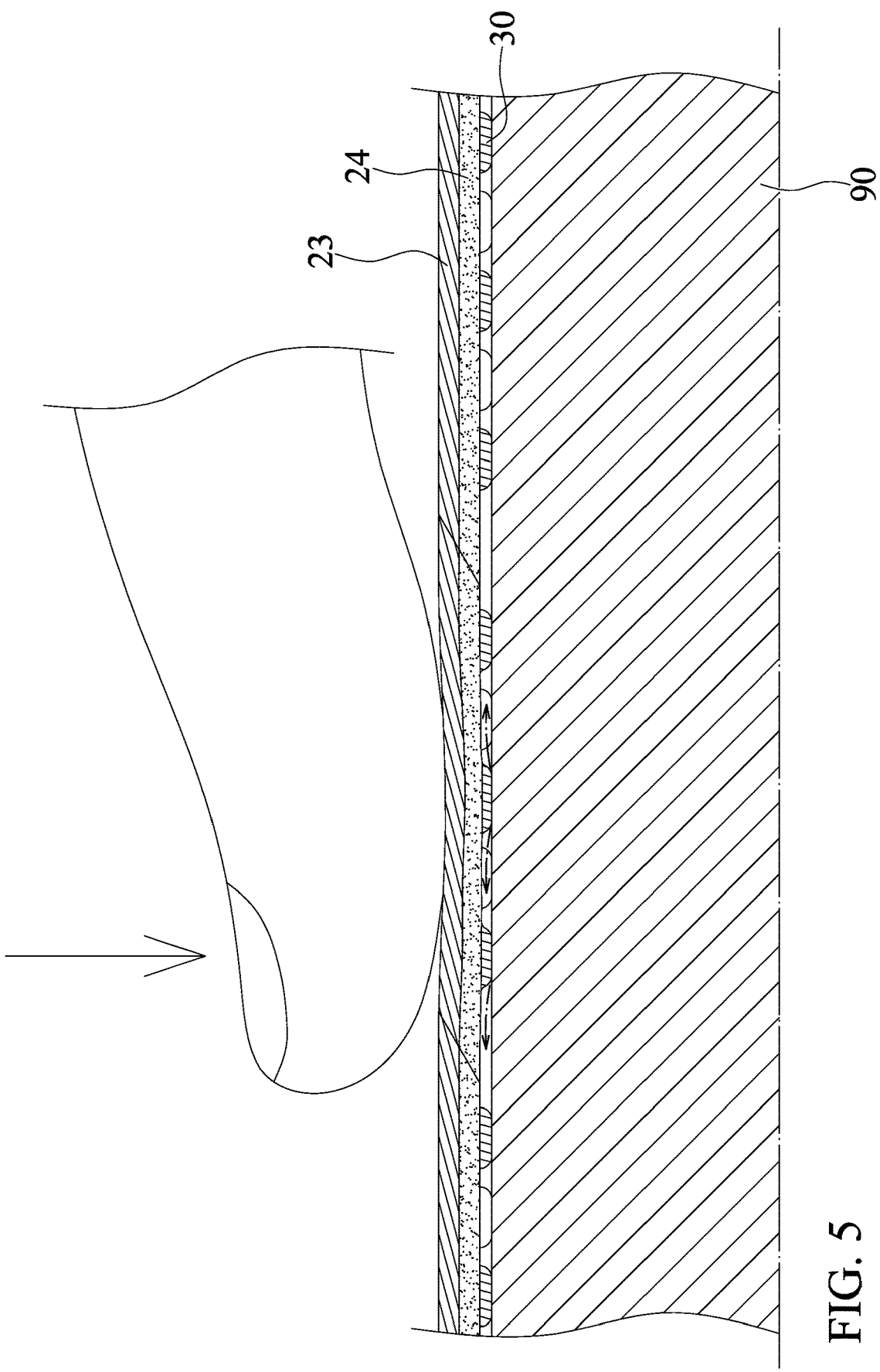
FIG. 5 shows air flowing between the grip strap and the handle after the user pressing the grip strap.
Figure 6:
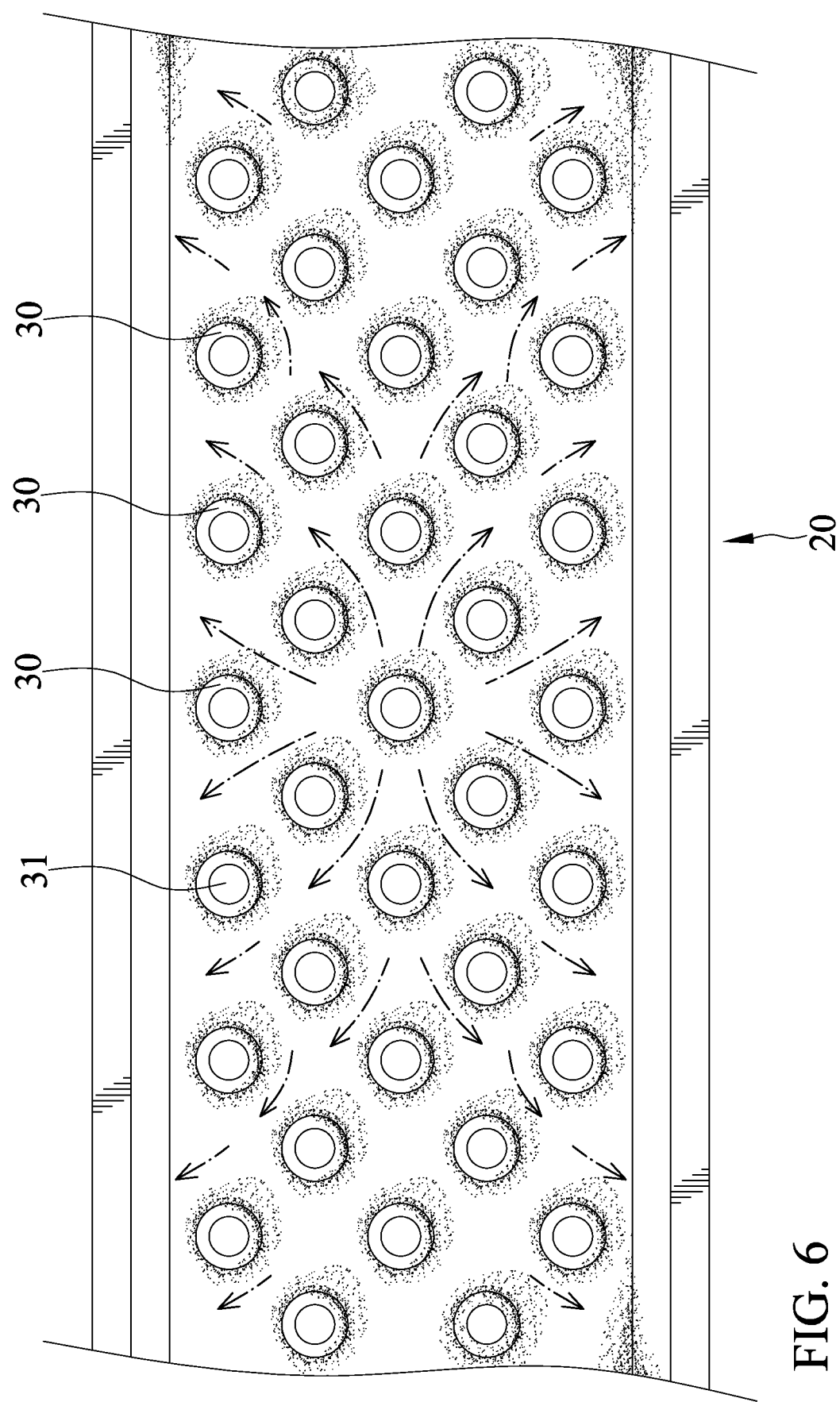
FIG. 6 is a cross-sectional view showing air ventilation in the grip strap.

Furthermore, as shown in FIGS. 5 and 6, a plurality of air channels are created between the plurality of elastic members 30 and the outer periphery of the handle 90. Therefore, the user is able to experience a ventilation effect when gripping the handle 90 wrapped by the grip strap 10. The plurality of air channels provides an extra anti-shock effect.

In view of the forgoing, the anti-shock and ventilated grip strap 10 includes the plurality of elastic members 30 adapted to absorb shocks. Furthermore, each elastic member 30 can absorb shocks effectively because it has a greater hardness than of the strap body 20. Additionally, the plurality of air channels allows air ventilation and provides an extra anti shock effect.

The foregoing is merely illustrative of the principles of this invention and various modifications can be made by those skilled in the art without departing from the scope and spirit of the invention.

What is claimed is:

1. An anti-shock and ventilated grip strap comprising:
    an strap body, wherein the strap body includes a substrate and a cushion layer overlapping the substrate, wherein each of the substrate and the cushion layer is in a form of a strap, and wherein the strap body has a hardness in the range of 40-70 in ASTM D2240 Type C hardness scale; and
    a plurality of elastic members configured to provide anti-shock effects, wherein the plurality of elastic members is disposed on and protruding away from the cushion layer, wherein the plurality of elastic members is arranged separately from one another, and wherein each of plurality of elastic members has a hardness greater than a hardness of the substrate and a hardness of the cushion layer.

2. The grip strap as claimed in claim 1, wherein the substrate is made of polyurethane, and wherein the cushion layer is made of Ethylene Vinyl Acetate.

3. The grip strap as claimed in claim 1, wherein the substrate is made of polyurethane, and wherein the cushion layer is made of Thermoplastic Polyurethane.

4. The grip strap as claimed in claim 1, wherein the substrate is made of polyurethane, and wherein the cushion layer is made of cloth.

5. The grip strap as claimed in claim 1, wherein the substrate and the cushion layer respectively have an original thickness in a thickness direction of the strap body, and wherein the original thickness of the cushion layer is between 0.8 and 1.2 times of the original thickness of the substrate.

6. The grip strap as claimed in claim 5, wherein each of the plurality of elastic members has an original thickness in the thickness direction of the strap body not less than half of the original thickness of the cushion layer.

7. The grip strap as claimed in claim 6, wherein the original thickness of each of the plurality of elastic members is not greater than the original thickness of the cushion layer.

8. The grip strap as claimed in claim 1, wherein the substrate of the strap body has a front side which is a flat smooth edge without any cavities.

9. A handle of a device comprising:
    the handle has a body adapted to be grasped when operating the device;
    a grip strap enclosing the body of the handle, comprising:
    an strap body, wherein the strap body includes a substrate and a cushion layer overlapping the substrate, wherein the substrate has a front side and a back side opposite to the front side and the cushion layer is disposed on the back side, wherein each of the substrate and the cushion layer is in a form of a strap, and wherein the strap body has a hardness in the range of 40-70 in ASTM D2240 Type C hardness scale; and
    a plurality of elastic members configured to provide anti-shock effects, wherein the plurality of elastic members is disposed on and protruding away from the cushion layer, wherein the plurality of elastic members is arranged separately from one another, and wherein each of plurality of elastic members has a hardness greater than a hardness of the substrate and a hardness of the cushion layer;
    wherein the plurality of elastic members abuts against and is in frictional contact with the body of the handle, and wherein the front side of the substrate is exposed and defines a receiving area for a user's hand.

10. The grip strap as claimed in claim 9, wherein the substrate is made of polyurethane, and wherein the cushion layer is made of Ethylene Vinyl Acetate.

11. The grip strap as claimed in claim 9, wherein the substrate is made of polyurethane, and wherein the cushion layer is made of Thermoplastic Polyurethane.

12. The grip strap as claimed in claim 9, wherein the substrate is made of polyurethane, and wherein the cushion layer is made of cloth.

13. The grip strap as claimed in claim 9, wherein the substrate and the cushion layer respectively have an original thickness in a thickness direction of the strap body, wherein the thickness of the cushion layer is between 0.8 and 1.2 times of the thickness of the substrate.

14. The grip strap as claimed in claim 13, wherein each of the plurality of elastic members has an original thickness in the thickness direction of the strap body not less than half of the original thickness of the cushion layer.

15. The grip strap as claimed in claim 14, wherein the original thickness of each of the plurality of elastic members is not greater than the original thickness of the cushion layer.

16. The grip strap as claimed in claim 9, wherein the front side of the strap body is a flat smooth edge without any cavities.

\* \* \* \* \*